United States Patent Office 2,790,013
Patented Apr. 23, 1957

2,790,013

PROCESS FOR HYDROBROMINATION OF OLEFINS

David K. Barnes, Kinston, N. C., assignor to Pan American Petroleum Corporation, Tulsa, Okla., a corporation of Delaware No Drawing. Application August 13, 1954,
Serial No. 449,780

5 Claims. (Cl. 260—663)

The present invention relates to a method for the preparation of 1- or normal bromides from the corresponding olefins and hydrogen bromide. More particularly, it is concerned with a method for the production of such compounds in the vapor phase by the use of a novel catalyst.

It is known that when a hydrogen halide, such as hydrogen chloride or hydrogen bromide, reacts with an olefin, the halogen atom of the acid molecule normally tends to attach itself to the carbon atom in the olefin holding the fewest hydrogen atoms. Subsequently, it was discovered that this order of addition of the acid to the olefin could be reversed, particularly in the case of hydrogen bromide, if the reaction were effected in the presence of air, oxygen, peroxides, and the like. The addition of hydrogen bromide to a 1-olefin, for example, to produce the corresponding 1-bromide, has been referred to as "abnormal addition." Investigations of this phenomenon have shown that this abnormal addition proceeds by means of a free radical mechanism whereas the normal reaction, i. e., where the halogen atom attaches itself to the carbon holding the least number of hydrogen atoms, occurs as a molecular addition process, possibly involving ions usually in solution or on catalytic surfaces. In the absence of oxygen, peroxides, etc., the normal addition of hydrogen bromide to the olefin is found to predominate. Generally speaking, the bromides in which the bromine is attached to the terminal carbon atom are more desirable for use in synthesis, etc. than the bromides resulting from normal addition.

I have now discovered that the abnormal addition of hydrogen bromide to 1-olefins under vapor phase conditions can be catalyzed by the use of activated carbon. This result is considered to be particularly surprising inasmuch as all prior procedures involving the abnormal addition of hydrogen bromide to olefins of which I am aware require the use of a substance capable of forming free radicals under the conditions of the reaction. None of the former methods involved the use of a contact material to promote the catalyst which could be used for indefinite periods of time, but on the contrary, such procedures are based on utilization of materials such as peroxides, ozone, acetone, etc., which are consumed during the course of the reaction.

In carrying out a preferred embodiment of my invention, the olefin in gaseous form is mixed with vapors of hydrogen bromide generated, for example, by boiling 48 percent hydrobromic acid. The resulting gaseous mixture which may contain the olefin and hydrogen bromide in a molecular ratio of from about 1.5:1 to about 3:1 is next allowed to contact an activated carbon catalyst at a temperature of about 175° to about 350° C., preferably from 275° to about 325° C. The resulting product gases are next cooled to a temperature of about 0° to −10° C., for example, by means of an ice water bath to separate the product as a liquid. Uncondensed gases after being preheated to about 100° C. may be recycled to the feed line connected to the reaction zone for further conversion. Isomeric bromides present in the liquid product may be separated by ordinary fractional distillation.

As examples of olefins which may be employed in carrying out the process of my invention, there may be mentioned propylene, 1-butylene, isobutylene, 1-pentene, styrene, and the like. The aforesaid compounds and their homologs may be substituted in varying degrees. The olefins may contain in their nucleus one or more halogen atoms attached to saturated or unsaturated carbon atoms, such as for example, the vinyl halides, allyl halides, methallyl halides, and the like.

Activated carbon employed as the catalyst in the process of my invention may be any of the number of the known materials derived from either vegetable or animal sources.

The abnormal addition of hydrogen bromide to olefins in accordance with my invention is preferably conducted as a continuous process, although it is to be understood that batch procedures may likewise be used. My invention is particularly suited to continuous operation because of the fact that the catalyst employed is of the contact type, and, as previously stated, is not consumed during the course of the reaction. I may employ the catalyst in the form of either a fixed or a fluidized bed. In both cases, the effluent gas after having products removed therefrom is recycled and mixed with fresh feed. The ratio of gas thus recycled to fresh feed may vary from about 1:1 to about 20:1. Space velocities in the fixed bed should generally range from about 50 volumes gas per hour per volume catalyst to about 2000 volumes gas per hour per volume catalyst, while space velocities of 10 volumes gas per hour per volume catalyst to 40 volumes gas per hour per volume catalyst should be used when employing the catalyst in the form of a fluid bed.

The process of my invention may be further illustrated by reference to the following example, the operating conditions of which exclude the use of any previously known catalyst for the abnormal addition of hydrogen bromide to 1-olefins.

EXAMPLE

Propylene was combined with gaseous hydrogen bromide generated by heating constant boiling (48 percent) hydrobromic acid and the resulting vaporous mixture introduced into a heat resistant glass tube packed with various contact materials indicated in the table below. The reaction tube was electrically heated and the product gas cooled in an ice water bath which was, in turn, connected to a water-cooled condenser so that only light uncondensable components passed out of the system. In these runs the space velocity varied from about 300 to 600 volumes gas per hour per volume catalyst. Periodically, products were removed from the receiver in the ice water bath. Other conditions employed are shown below. The results are given on a once-through basis.

Table I

| Run No. | Catalyst | Temp., °C | Feed, mols/hr. | | | Conversion, Mol Percent [1] | Percent Selectivity to 1-Isomer |
|---|---|---|---|---|---|---|---|
| | | | $C_3H_6$ | HBr | $H_2O$ | | |
| 1 | Glass wool | 138 | 0.2 | 0.1 | 0.5 | trace | |
| 2 | Pumice | 200 | 0.2 | 0.1 | 0.5 | trace | |
| 3 | Activated carbon | 200 | 0.4 | 0.2 | 1.0 | 34.3 | 7.6 |
| 4 | do | 300 | 0.4 | 0.2 | 1.0 | 18.5 | 18.9 |

[1] Based on HBr.

From the results appearing in the above table, it is evident that activated carbon functions as a catalyst for the abnormal addition of hydrogen bromide to 1-olefins.

I claim:

1. In a process for the abnormal addition of hydrogen bromide to a 1-olefin, the steps which comprises contacting a mixture of hydrogen bromide and said 1-olefin with activated carbon at a temperature of from about 175 to about 350° C.

2. The process of claim 1 in which the temperature employed ranges from about 275° to about 325° C.

3. The process of claim 2 in which the olefin employed is an aliphatic 1-olefin.

4. In a continuous process for the abnormal addition of hydrogen bromide to an aliphatic 1-olefin, the steps which comprise contacting a mixture of hydrogen bromide and said olefin with activated carbon in a reaction zone at a temperature of from about 275° to about 325° C., separating alkyl bromides from the resulting product mixture, and returning unreacted olefin and hydrogen bromide to said zone for further conversion.

5. The process of claim 4 in which propylene is the aliphatic 1-olefin.

References Cited in the file of this patent

FOREIGN PATENTS 353,032   Great Britain _____ July 20, 1931